United States Patent
Podolsky (10) Patent No.: US 9,277,431 B1
(45) Date of Patent: Mar. 1, 2016

(54) SYSTEM, METHOD, AND COMPUTER PROGRAM FOR GENERATING MOBILE SUBSCRIBER NETWORK EXPERIENCE INDICATORS BASED ON GEO-LOCATED EVENTS

(71) Applicant: Amdocs Software Systems Limited, Dublin (IE)

(72) Inventor: Gabriel Podolsky, Nesher (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/267,832

(22) Filed: May 1, 2014

(51) Int. Cl.
*H04W 24/00* (2009.01)
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | |
|---|---|---|---|
| 7,599,359 B1 * | 10/2009 | Croak et al. | 370/356 |
| 7,830,812 B2 * | 11/2010 | Atkins et al. | 370/252 |
| 8,364,141 B1 * | 1/2013 | Kateley et al. | 455/423 |
| 2006/0258339 A1 * | 11/2006 | Connelly et al. | 455/414.1 |
| 2007/0116235 A1 * | 5/2007 | Heinmiller et al. | 379/221.08 |
| 2009/0181665 A1 * | 7/2009 | Sater et al. | 455/424 |
| 2013/0100843 A1 * | 4/2013 | Croak et al. | 370/252 |
| 2014/0256310 A1 * | 9/2014 | Wang et al. | 455/423 |
| 2015/0089054 A1 * | 3/2015 | Rizzi et al. | 709/224 |
| 2015/0128056 A1 * | 5/2015 | Rizzi et al. | 715/736 |

* cited by examiner

*Primary Examiner* — Kimberly A Williams
(74) *Attorney, Agent, or Firm* — Zilka-Kotab, PC (57) ABSTRACT

A system, method, and computer program product are provided for generating mobile subscriber network experience indicators based on geo-located events. In use, one or more call trace logs are received including protocol flow information between User Equipment and one or more network elements associated with a network. Additionally, one or more call detail records are generated utilizing the one or more call trace logs, each of the one or more call detail records including an associated international mobile subscriber identity (IMSI). Further, the one or more call detail records are geo-tagged with location information associated with the one or more call trace logs. In addition, the one or more geo-tagged call detail records are aggregated based on the international mobile subscriber identity associated with the one or more geo-tagged call detail records, such that a subscriber corresponding to the international mobile subscriber identity is associated with at least one of the aggregated geo-tagged call detail records. Furthermore, a plurality of key performance indicators are identified for the subscriber, utilizing the at least one aggregated geo-tagged call detail record associated with the subscriber. Moreover, a network experience indicator associated with the subscriber is generated utilizing one or more of the plurality of key performance indicators. Still yet, the network experience indicator associated with the subscriber is displayed utilizing a graphical user interface.

15 Claims, 6 Drawing Sheets

SYSTEM, METHOD, AND COMPUTER PROGRAM FOR GENERATING MOBILE SUBSCRIBER NETWORK EXPERIENCE INDICATORS BASED ON GEO-LOCATED EVENTS

FIELD OF THE INVENTION

The present invention relates to cellular networks, and more particularly to generating mobile subscriber network experience indicators based on geo-located events in such networks.

BACKGROUND

Forty percent of an individual mobile subscriber's experience is determined by the quality of the network. Currently, operators do not have access to actionable data relating to the subscriber's network experience that can be used to improve customer care, support intelligent network rollout, drive marketing use cases and prioritise network fault resolution.

Current Customer Experience Management (CEM) systems use probes (intrusive or passive), which collect protocol flow data in the cellular network core (e.g. Gn IRP, between RNC and MSC in UMTS). Due to the nature of the collection point, these probe based systems lack the actual network information that is only available when collecting data at the Radio Access Network (RAN). For example, precision information for geo-tagging and network health cannot be captured is these systems.

There is thus a need for addressing these and/or other issues associated with the prior art.

SUMMARY

A system, method, and computer program product are provided for generating mobile subscriber network experience indicators based on geo-located events. In use, one or more call trace logs are received including protocol flow information between User Equipment and one or more network elements associated with a network. Additionally, one or more call detail records are generated utilizing the one or more call trace logs, each of the one or more call detail records including an associated international mobile subscriber identity (IMSI). Further, the one or more call detail records are geo-tagged with location information associated with the one or more call trace logs. In addition, the one or more geo-tagged call detail records are aggregated based on the international mobile subscriber identity associated with the one or more geo-tagged call detail records, such that a subscriber corresponding to the international mobile subscriber identity is associated with at least one of the aggregated geo-tagged call detail records. Furthermore, a plurality of key performance indicators are identified for the subscriber, utilizing the at least one aggregated geo-tagged call detail record associated with the subscriber. Moreover, a network experience indicator associated with the subscriber is generated utilizing one or more of the plurality of key performance indicators. Still yet, the network experience indicator associated with the subscriber is displayed utilizing a graphical user interface.

DETAILED DESCRIPTION

Figure 1:
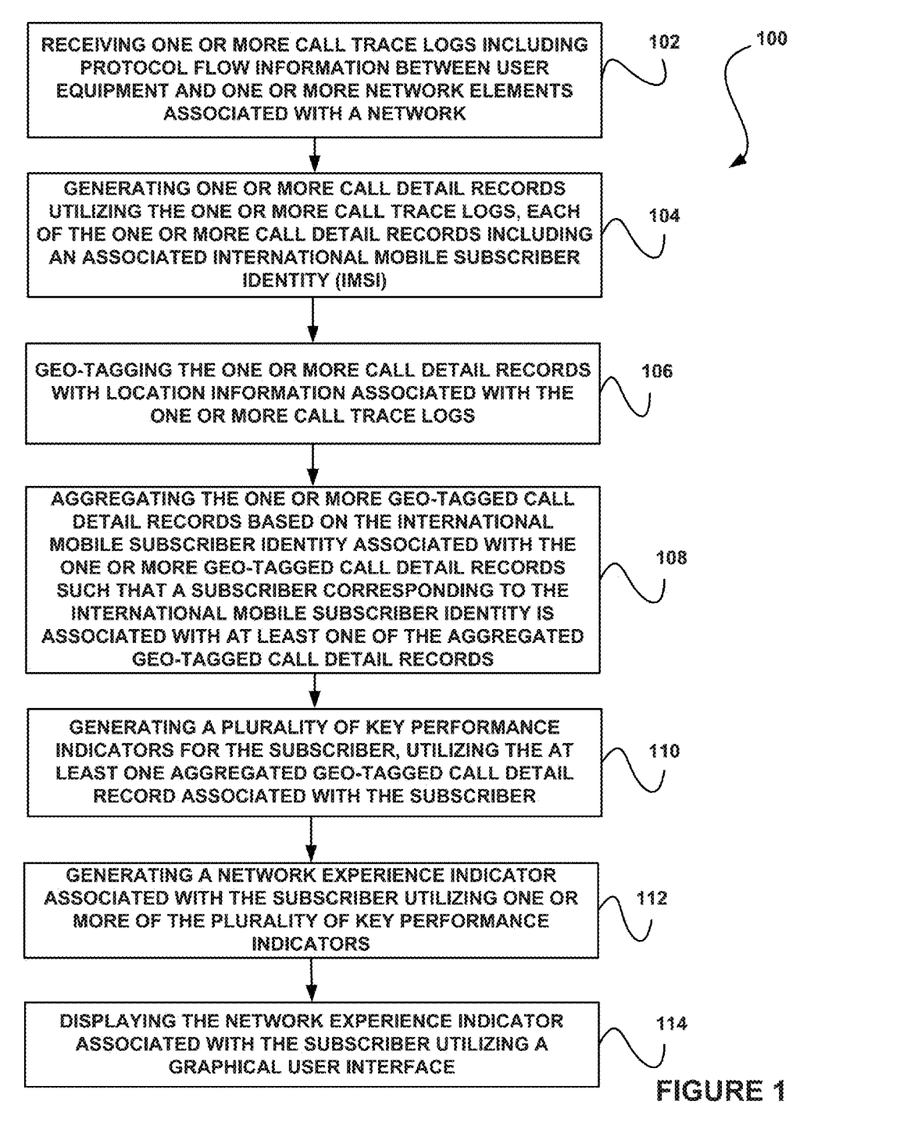
FIG. 1 illustrates a method for generating mobile subscriber network experience indicators based on geo-located events, in accordance with one embodiment.

FIG. 1 illustrates a method 100 for generating mobile subscriber network experience indicators based on geo-located events, in accordance with one embodiment.

As shown, one or more call trace logs are received including protocol flow information between User Equipment and one or more network elements associated with a cellular network. See operation 102.

The User Equipment may include any type of device. For example, in various embodiments, the User Equipment may include a mobile (cellular) phone, a tablet computer, a laptop computer, and/or various other devices.

Further, the network elements may include various network devices. For example, the network elements may include a radio controller, such as a radio network controller (RNC) in a UMTS network, or an Evolved Node B (eNodeB) in a Long Term Evolution (LTE) network.

The call trace logs refer to any log that captures the protocol flow between the User Equipment and the cellular base station in the network. The network area that the call trace logs reflect is the Radio Access Network (RAN). In one embodiment, the call trace logs may include call geographical coordinates associated with a corresponding User Equipment.

As shown further in FIG. 1, one or more call detail records (CDRs) are generated utilizing the one or more call trace logs, each of the one or more call detail records including an associated international mobile subscriber identity (IMSI). See operation 104.

In various embodiments, the call detail record may include data such as the IMSI, a timestamp, call duration information, success/fail status, and/or Indoor/Outdoor call indication and radio quality parameters (e.g. RSCP and EcNo), etc. Using a call trace, a processing node may function to produce a network call detail record including all network events of interest, among them voice calls and data sessions.

Further, the one or more call detail records are geo-tagged with location information associated with the one or more call trace logs. See operation 106. For example, a system or processing node that processes the call trace log may also calculate the call geographical coordinates (latitude/longitude) with high precision (e.g. 100 m×100 m polygon, etc.). Once the call coordinates are calculated, the record may be considered geo-tagged (or geo-located).

In addition, the one or more geo-tagged call detail records are aggregated based on the international mobile subscriber identity associated with the one or more geo-tagged call detail records, such that a subscriber corresponding to the international mobile subscriber identity is associated with at least one of the aggregated geo-tagged call detail records. See operation 108.

Furthermore, a plurality of key performance indicators (KPIs) are identified for the subscriber, utilizing the at least one aggregated geo-tagged call detail record associated with the subscriber. See operation 110. The key performance indicators for the subscriber may be associated with a specific time period and location.

Additionally, the key performance indicators may be associated with various aspects of the network and/or the subscriber. For example, in various embodiments, the key performance indicators may be associated with one or more of voice calls, text messages, data sessions, applications, services, and/or the User Equipment, etc.

Further, in various embodiments, the key performance indicators may include one or more of a total number of voice calls, a number of voice failed connections, a total number of voice drop calls, a total number of data sessions, a number of data session failed connections, a number of data sessions dropped, a percentage of dropped calls, a percentage of failed connections, a percentage of dropped sessions, a percentage of failed connections, and/or a network health, etc. In various embodiments, the key performance indicators may be calculated for a multiple granularities (e.g. 15 minutes, 1 hour, 1 day, etc.).

As shown in FIG. 1, a network experience indicator associated with the subscriber is generated utilizing one or more of the plurality of key performance indicators. See operation 112. The network experience indicator associated with the subscriber is displayed utilizing a graphical user interface. See operation 114.

The network experience indicator may include any indicator associated with an experience of the subscriber. For example, in various embodiments, the network experience indicator may include a grade or rating for a particular service associated with the user. For example, in various embodiments, the network experience indicator may be associated with voice, data, text messaging, a device, and/or an application associated with the subscriber.

In one embodiment, the method 100 may further include generating a network health indicator associated with the network. In this case, the network health indicator may be calculated utilizing a plurality of call detail records corresponding to a plurality of subscribers associated with the network. Additionally, the network health indicator may be calculated for a plurality of locations associated with the call detail records.

Further, in one embodiment, the network health indicator may be calculated utilizing call indication and radio quality parameters associated with the network. As an example, the network health indicator may include a good indication, a fair indication, a bad indication, or a very bad indication. As an option, the network health indicator may be displayed utilizing the graphical user interface.

In one embodiment, the network experience indicator associated with the subscriber may be compared with the network health indicator for a specific time period and a specific location. In this case, it may be determined whether service failures associated with the subscriber are due to network problems or subscriber-related problems, based on the comparison.

In various embodiments, the graphical user interface may display a variety of information associated with a subscriber and/or the network, etc. For example, in various embodiments, the graphical user interface may be capable of displaying voice session failure information, data session failure information, and text messaging failure information. The voice session failure information, data session failure information, and text messaging failure information may be displayed based on location or date.

Thus, the method 100 may be utilized such that customer care systems may provide a view of the subscriber network experience based on network events (e.g. drop calls, etc.). Utilizing these techniques, a system may take call trace logs from network elements (e.g. RNCs, etc.), create discrete events in the form of call detail records, add geo-tagging (latitude/longitude), aggregate the information per IMSI, and present the subscriber experience to a customer service representative (CSR). The system may also compare the subscriber network experience for a given time period and location with the network coverage information collected from the same source, in order to determine if subscriber service failures are due to network problems or subscriber related problems.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
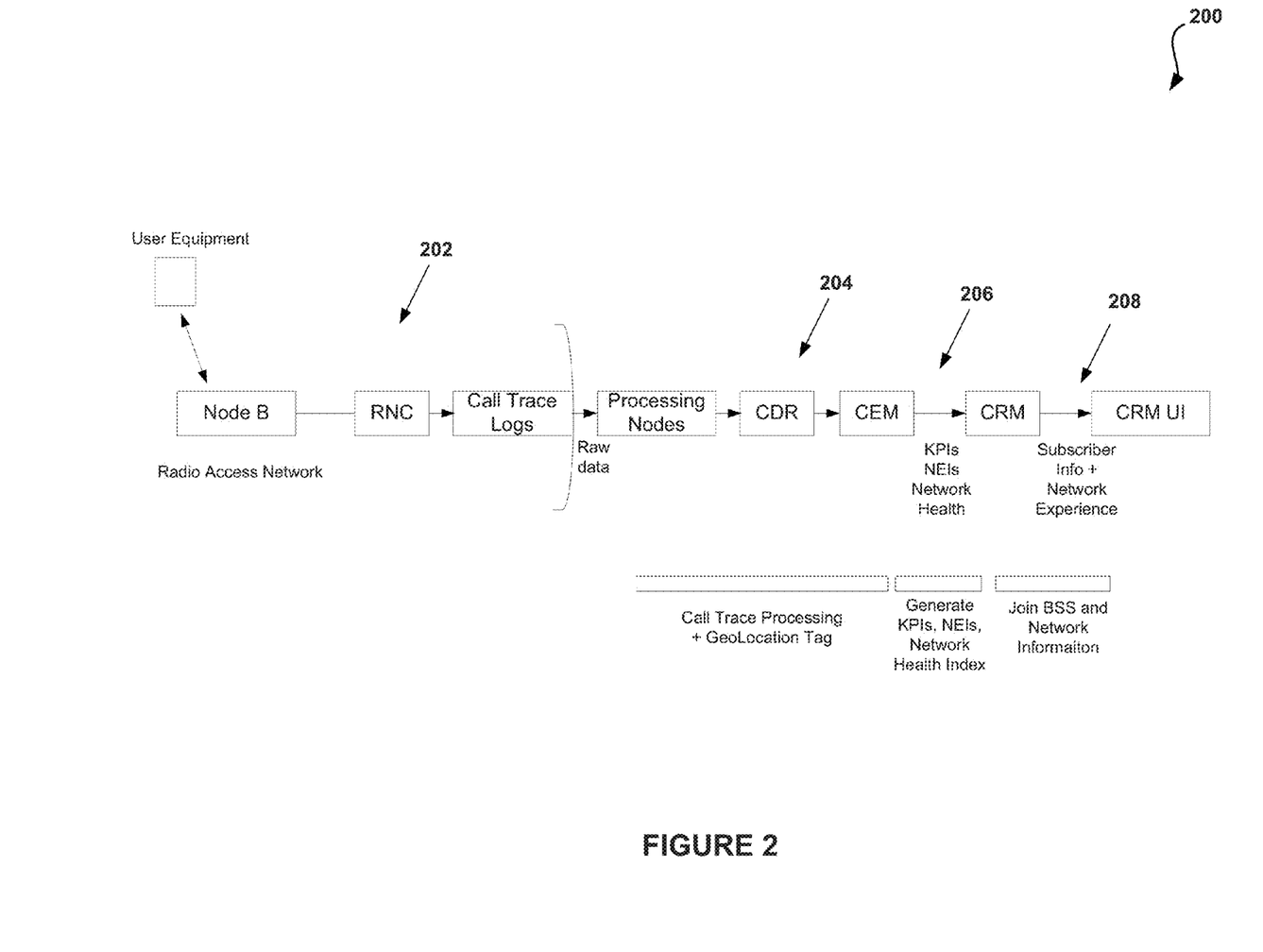
FIG. 2 illustrates a system flow diagram for generating mobile subscriber network experience indicators based on geo-located events, in accordance with one embodiment.

FIG. 2 illustrates a system flow diagram 200 for generating mobile subscriber network experience indicators based on geo-located events, in accordance with one embodiment. As an option, the system flow diagram 200 may be implemented in the context of the details of FIG. 1. Of course, however, the system flow diagram 200 may be implemented in the context of any desired environment. Further, the aforementioned definitions may equally apply to the description below.

In operation, in cellular networks, radio controllers (e.g. RNC in UMTS, eNodeB in LTE) may collect measurements and events in call trace log files. See step 202. These call trace logs capture the protocol flow between the User Equipment (e.g. cell phones, smart phones, tablets, etc.) and the cellular base station (e.g. NodeB in UMTS, eNodeB in LTE, etc.). Hence, the network area that the call trace logs reflect is the Radio Access Network.

Using a call trace, a processing node can produce a network call detail record (CDR) containing all network events of interest, among them voice calls and data sessions. See step 204. Such call detail record may include data such as an IMSI, timestamp, call duration, success/fail status, and/or Indoor/Outdoor call indication and radio quality parameters (e.g. RSCP and EcNo, etc.), etc.).

A system that processes the call trace may also calculate the call geographical coordinates (latitude/longitude) with high precision (e.g. 100 m×100 m polygon). Once the call coordinates are calculated, the record is called geo-tagged (or geo-located).

These call detail records are passed to a Customer Experience Management (CEM) processing module that creates KPIs (Key Performance Indicators) for each subscriber, at each time period and location. See step 206. Several Key Performance Indicators may then be combined into a network experience indicator (NEI) formula for each service that the subscriber has purchased from the cellular operator.

The Customer Experience Management processing module may, in parallel, use the radio quality parameters (EcNo, RSCP, etc.) in order to calculate a Network Health Index (i.e. a Coverage index) for each location at all time periods. This Network Health Index may be calculated from records of all subscribers in each location and may be expressed in a few parameters, such as Good, Fair, Bad, or Very Bad.

The Key Performance Indicators and network experience indicators are then retrieved by a Customer Resource Management (CRM) system, allowing a customer service representative (CSR) to visualize the subscriber network experience for any time and location. See operation 208. With the Network Health Index, the CRM system may allow the CSR to distinguish between locations in which the service failures for the subscriber were due to network coverage problems and locations in which the network had good coverage and yet the subscriber experienced service failures (e.g. due to calls made with User Equipment with known technical deficiencies, etc.).

Figure 3:
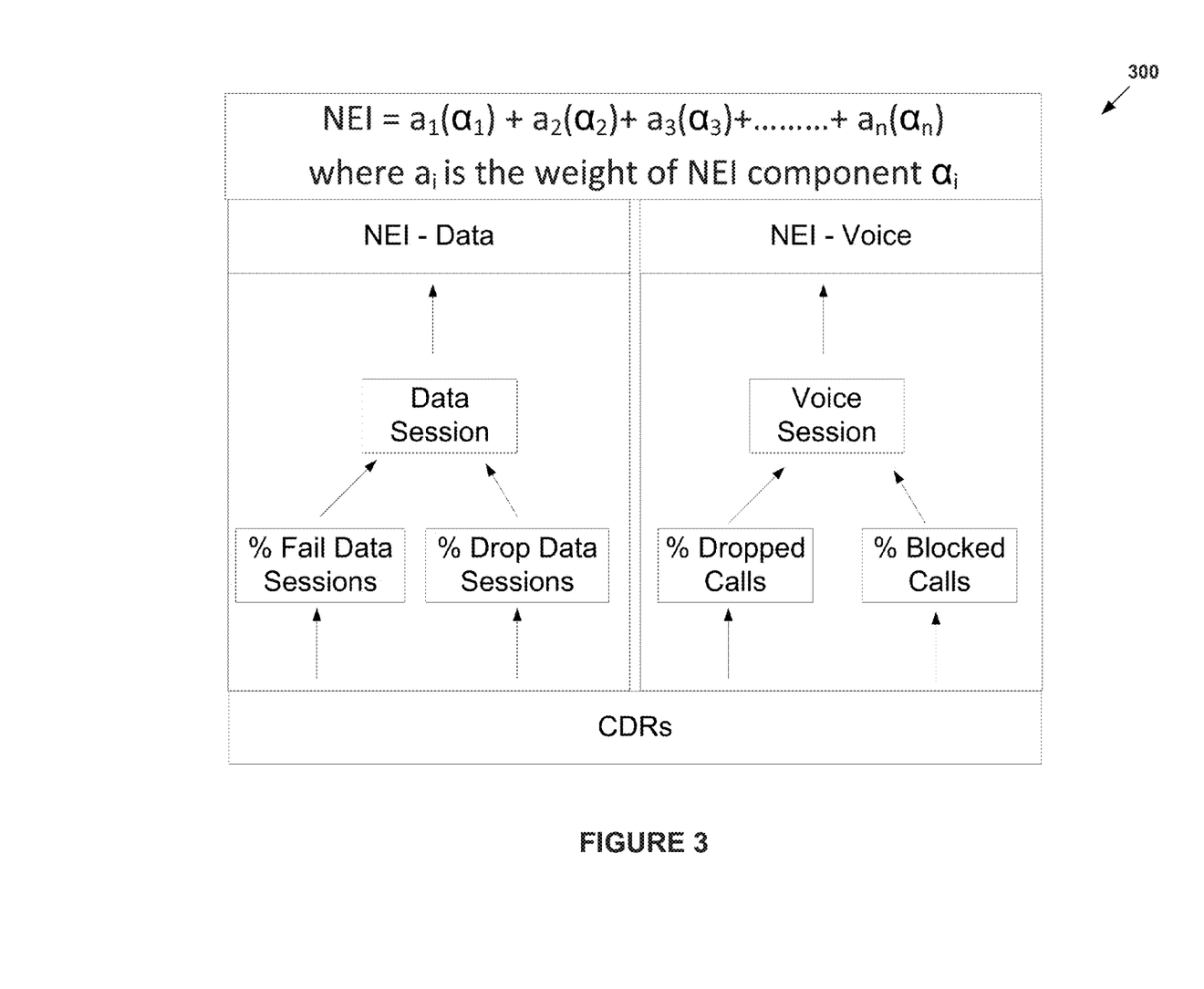
FIG. 3 illustrates a flow diagram for generating key performance indicators and network experience indicators from call detail records, in accordance with one embodiment.

FIG. 3 illustrates a flow diagram 300 for generating key performance indicators and network experience indicators from call detail records, in accordance with one embodiment. As an option, the flow diagram 300 may be viewed in the context of the details of the previous figures. Of course, however, the flow diagram 300 may be viewed in the context of any desired environment. Further, the aforementioned definitions may equally apply to the description below.

In various embodiments, key performance indicators and network experience indicators may be generated from call detail records or any other data source. The network experience indicators may be associated with voice, data, SMS, devices, applications, and/or various other aspects of a network.

Moreover, the network experience indicators may be calculated using the key performance indicators over a predefined period of time, based on various formulas. For example, the formula may be in the form of: f (KPIa*Wa+KPIb*Wb+ . . . ), for all the samples from NOW until NOW-X days, Sum(Wi)=1, where W=weight, and f=function. As an example: Avg (% call drops*0.6+% failed calls*0.4), for all the samples from NOW until NOW-7 days.

Additionally, the network experience indicator may be scaled and/or normalized. For example, the network experience indicators may all be normalized to a single type of scale/unit, mapping them to a subscriber experience from 1 to 10, when 1 is worst and 10 is best. In this case, these numbers, 1 to 10, may be bins in which the network experience indicator formula may be mapped.

The mathematical formula would normally give a value such as a percentage (0 . . . 100) which is mapped to the bins, but in most cases not linearly. In other words, the minimal threshold value for being above the "worst" bin (1) might be 80% where, as an example, 80% drop calls is very bad. Further, each bin may have a map to a color (Red, Yellow, and Green). In this case, the mapping of the network experience indicator values to the bins may be customizable (e.g. with a default).

If the NEI formula is a percentage success/failure (e.g. % calls drop, etc.), the bin mapping will not be a direct numeric mapping. In this case, it may be based on a threshold that below a certain percentage of drop calls, the network experience is bad.

For example, a voice NEI may be based on call drops+failed calls. If the formula for the past week shows 3% drop calls and 5% failed calls, the combined experience is 8% failure, where the voice experience for this subscriber will be on bin 3, while the threshold for RED is for bins 1 to 5.

Figure 4:
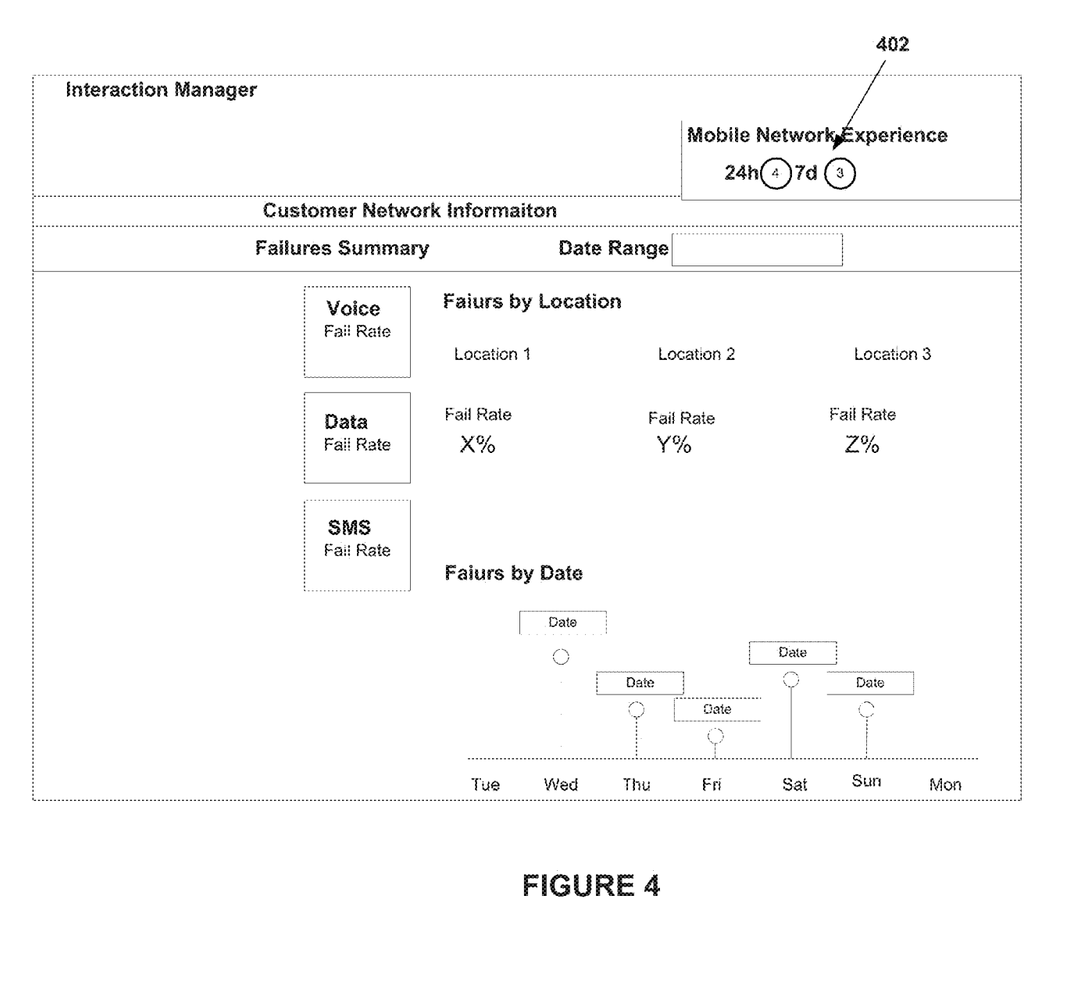
FIG. 4 illustrates a graphical user interface for displaying network experience indicators associated with customers, in accordance with one embodiment.

FIG. 4 illustrates a graphical user interface 400 for displaying network experience indicators associated with customers, in accordance with one embodiment. As an option, the graphical user interface 400 may be viewed in the context of the details of the previous figures. Of course, however, the graphical user interface 400 may be viewed in the context of any desired environment. Further, the aforementioned definitions may equally apply to the description below.

In one embodiment, the graphical user interface 400 may represent a network experience screen that a customer service representative may utilize to visualize the subscriber network experience. As shown, the graphical user interface 400 may display a network experience indicator 402 associated with a subscriber.

Additionally, the graphical user interface 400 may display failures (e.g. voice session, data session, SMS, etc.) based on a percentage of calls, etc. Further, the graphical user interface 400 may display failures by date.

Figure 5:
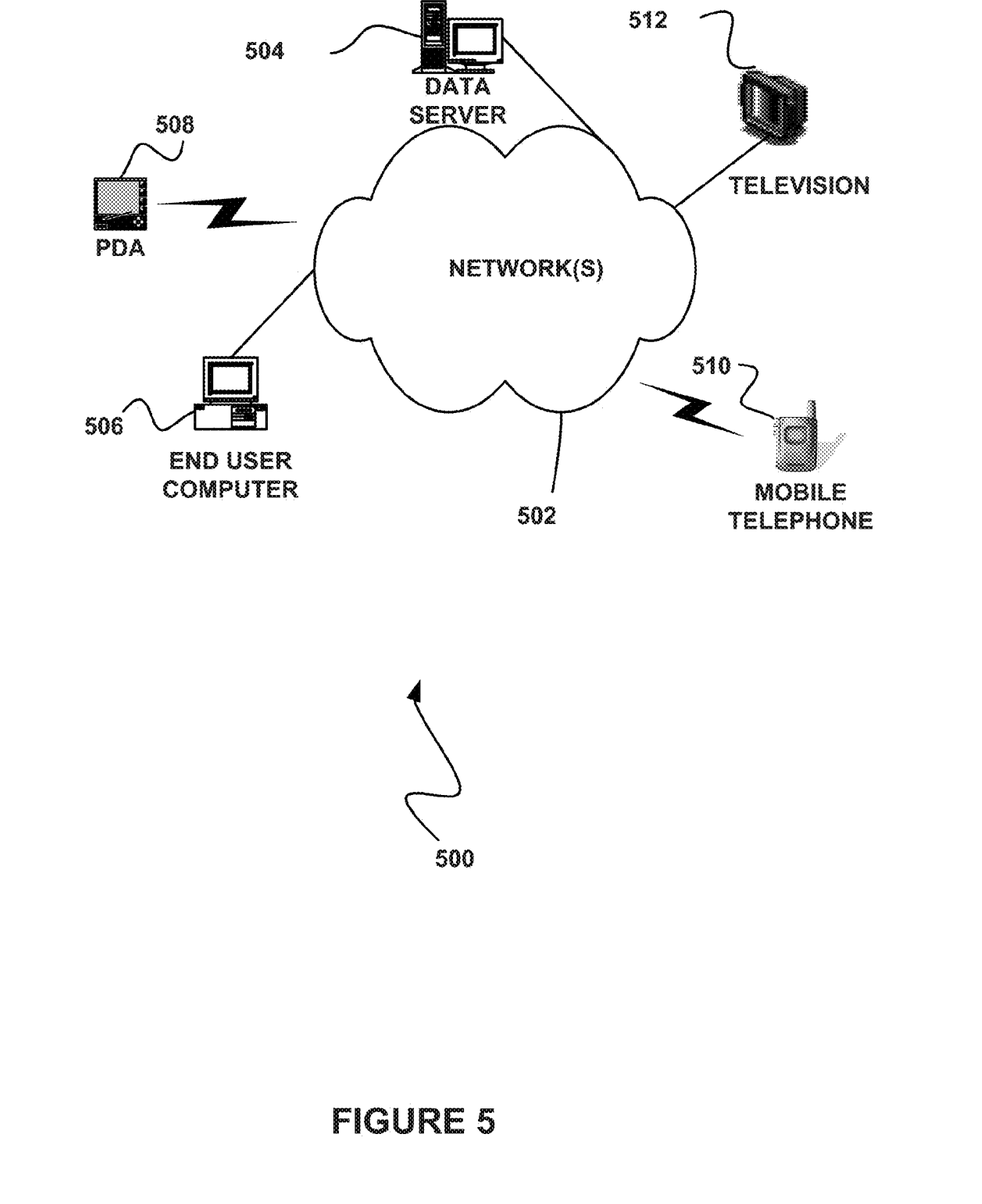
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
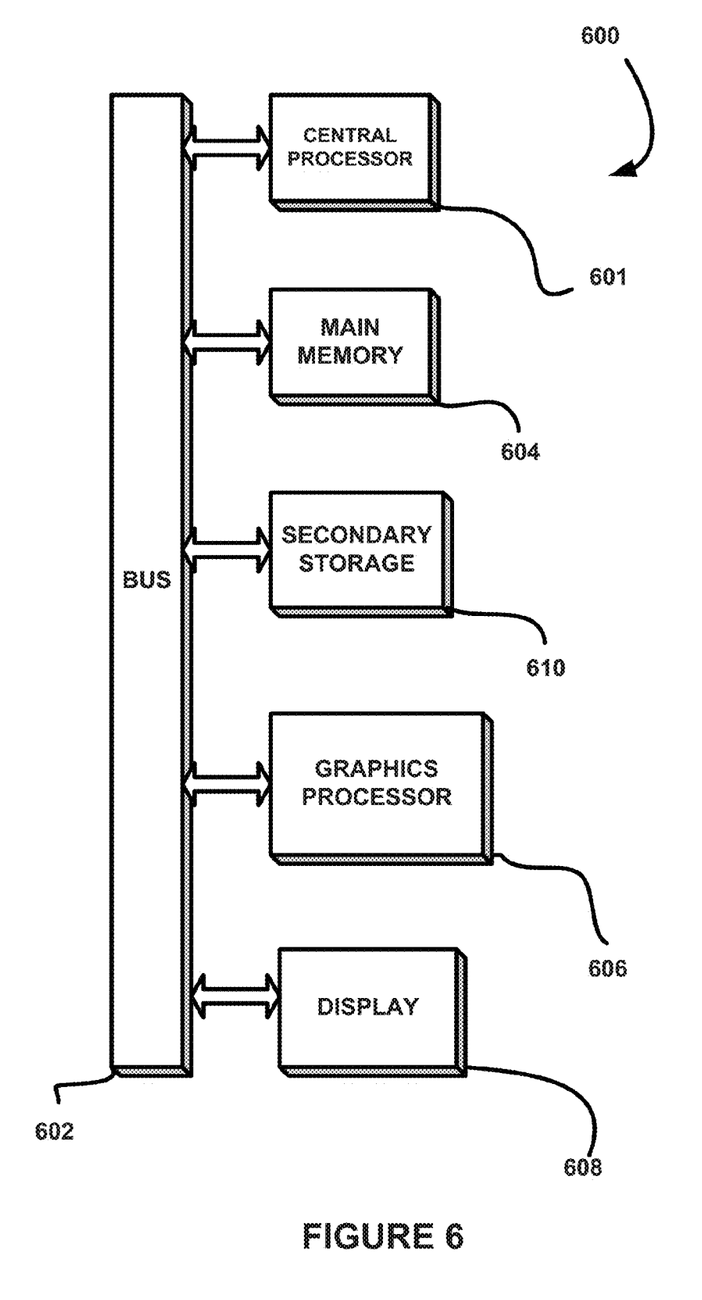
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
computer code for receiving one or more call trace logs including protocol flow information between User Equipment and one or more network elements associated with a network;

computer code for generating one or more call detail records utilizing the one or more call trace logs, each of the one or more call detail records including an associated international mobile subscriber identity (IMSI);

computer code for geo-tagging the one or more call detail records with location information associated with the one or more call trace logs;

computer code for aggregating the one or more geo-tagged call detail records based on the international mobile subscriber identity associated with the one or more geo-tagged call detail records, such that a subscriber corresponding to the international mobile subscriber identity is associated with at least one of the aggregated geo-tagged call detail records;

computer code for identifying a plurality of key performance indicators for the subscriber, utilizing the at least one aggregated geo-tagged call detail record associated with the subscriber;

computer code for generating a network experience indicator associated with the subscriber utilizing one or more of the plurality of key performance indicators; and computer code for displaying the network experience indicator associated with the subscriber utilizing a graphical user interface;

computer code for calculating a network health indicator associated with the network utilizing a plurality of call detail records corresponding to a plurality of subscribers associated with the network;

computer code for comparing the network experience indicator associated with the subscriber to the network health indicator for a specific time period and a specific location; and computer code for determining whether service failures associated with the subscriber are due to network problems or subscriber-related problems, based on the comparing.

2. The computer program product of claim 1, wherein the computer program product is operable such that the network health indicator is calculated utilizing call indication and radio quality parameters associated with the network.

3. The computer program product of claim 1, wherein the computer program product is operable such that the network health indicator includes one of a good indication, a fair indication, a bad indication, or a very bad indication.

4. The computer program product of claim 1, further comprising computer code for displaying the network health indicator utilizing the graphical user interface.

5. The computer program product of claim 1, wherein the computer program product is operable such that the one or more call detail records further include at least one of a timestamp, a call duration, a success status, a fail status, or radio quality parameters.

6. The computer program product of claim 1, wherein the computer program product is operable such that each of the one or more call trace logs includes call geographical coordinates associated with a corresponding User Equipment.

7. The computer program product of claim 1, wherein the computer program product is operable such that the plurality of key performance indicators for the subscriber are associated with a specific time period and location.

8. The computer program product of claim 1, wherein the computer program product is operable such that the plurality of key performance indicators are associated with one or more of voice calls, text messages, data sessions, applications, services, or the User Equipment.

9. The computer program product of claim 1, wherein the computer program product is operable such that the plurality of key performance indicators include one or more of a total number of voice calls, a number of voice failed connections, a total number of voice drop calls, a total number of data sessions, a number of data session failed connections, and a number of data sessions dropped.

10. The computer program product of claim 1, wherein the computer program product is operable such that the plurality of key performance indicators are calculated for multiple granularities.

11. The computer program product of claim 1, wherein the computer program product is operable such that the network experience indicator is associated with one of voice, data, text messaging, a device, or an application.

12. The computer program product of claim 1, wherein the computer program product is operable such that the graphical user interface is capable of displaying voice session failure information, data session failure information, and text messaging failure information.

13. The computer program product of claim 12, wherein the computer program product is operable such that the voice session failure information, the data session failure information, and the text messaging failure information are displayed based on location or date.

14. A method, comprising:
receiving one or more call trace logs including protocol flow information between User Equipment and one or more network elements associated with a network;

generating one or more call detail records utilizing the one or more call trace logs, each of the one or more call detail records including an associated international mobile subscriber identity (IMSI);

geo-tagging the one or more call detail records with location information associated with the one or more call trace logs;

aggregating the one or more geo-tagged call detail records based on the international mobile subscriber identity associated with the one or more geo-tagged call detail records, such that a subscriber corresponding to the international mobile subscriber identity is associated with at least one of the aggregated geo-tagged call detail records;

identifying a plurality of key performance indicators for the subscriber, utilizing the at least one aggregated geo-tagged call detail record associated with the subscriber;

generating a network experience indicator associated with the subscriber utilizing one or more of the plurality of key performance indicators; and displaying the network experience indicator associated with the subscriber utilizing a graphical user interface;

calculating a network health indicator associated with the network utilizing a plurality of call detail records corresponding to a plurality of subscribers associated with the network;

comparing the network experience indicator associated with the subscriber to the network health indicator for a specific time period and a specific location; and determining whether service failures associated with the subscriber are due to network problems or subscriber-related problems, based on the comparing.

15. A system comprising:
a memory system; and
one or more processing cores coupled to the memory system and that are each configured to:
receive one or more call trace logs including protocol flow information between User Equipment and one or more network elements associated with a network;

generate one or more call detail records utilizing the one or more call trace logs, each of the one or more call detail records including an associated international mobile subscriber identity (IMSI);

geo-tag the one or more call detail records with location information associated with the one or more call trace logs;

aggregate the one or more geo-tagged call detail records based on the international mobile subscriber identity associated with the one or more geo-tagged call detail records, such that a subscriber corresponding to the international mobile subscriber identity is associated with at least one of the aggregated geo-tagged call detail records;

identify a plurality of key performance indicators for the subscriber, utilizing the at least one aggregated geo-tagged call detail record associated with the subscriber;

generate a network experience indicator associated with the subscriber utilizing one or more of the plurality of key performance indicators; and display the network experience indicator associated with the subscriber utilizing a graphical user interface;

calculate a network health indicator associated with the network utilizing a plurality of call detail records corresponding to a plurality of subscribers associated with the network;

compare the network experience indicator associated with the subscriber to the network health indicator for a specific time period and a specific location; and determine whether service failures associated with the subscriber are due to network problems or subscriber-related problems, based on the comparing.

\* \* \* \* \*